(12) United States Patent
Forbis, III et al.

(10) Patent No.: US 7,809,880 B2
(45) Date of Patent: Oct. 5, 2010

(54) SYSTEMS AND METHODS FOR MANAGING TAPE DRIVE OPERATION

(75) Inventors: William R. Forbis, III, Rockwall, TX (US); Patrick H. Horsley, Montgomery, TX (US)

(73) Assignee: L-3 Communications Integrated Systems L.P., Greenville, TX (US)

( * ) Notice: Subject to any disclaimer, the term of this patent is extended or adjusted under 35 U.S.C. 154(b) by 414 days.

(21) Appl. No.: 11/901,446

(22) Filed: Sep. 17, 2007

(65) Prior Publication Data

US 2009/0077300 A1    Mar. 19, 2009

(51) Int. Cl.
G06F 13/10    (2006.01)
(52) U.S. Cl. ........................... 711/111; 711/114
(58) Field of Classification Search .................. None
See application file for complete search history.

(56) References Cited

U.S. PATENT DOCUMENTS

| | | | |
|---|---|---|---|
| 5,502,811 | A | 3/1996 | Ripberger |
| 6,532,548 | B1 | 3/2003 | Hughes |
| 7,155,634 | B1 | 12/2006 | Le Graverand et al. |
| 7,350,101 | B1 * | 3/2008 | Nguyen et al. .............. 714/6 |
| 2002/0004883 | A1 * | 1/2002 | Nguyen et al. ............. 711/111 |

OTHER PUBLICATIONS

Ultera, "Tape Library Striping", Seamless Scalability, Printed From Internet on Apr. 13, 2007, 1 pg.
Ultera, "Railmaster—Multiple Tape Libraries", Seamless Scalability, Printed From Internet on Apr. 13, 2007, 3 pgs.
Ultera, "Tape Library RAID", Seamless Scalability, Printed From Internet on Apr. 13, 2007, 1 pg.
Ultera, in the Case of Tape, RAID Stands for "Redundant Array of Independent Devices", Seamless Scalability, Available From Internet at Least As Early As Apr. 13, 2007, 5 pgs.
Ultera Striper 4, Tape RAID Controller, 2002, 2 pgs.
Ultera, "Simply the Fastest Most Reliable Tape Array Controllers", Seamless Scalability, Printed From Internet on Apr. 13, 2007, 1 pg.
Ultera, Press Release, Ultera Introduces "Two-In-One" RAID Tape Array Controllers, Seamless Scalability, Printed From Internet on Apr. 13, 2007, 2 pgs.
CA, Brightstor ARCservce Backup Tape RAID Option, Printed from the Internet Apr. 13, 2007, 2 pgs.
Adaptec, "Adaptec Product Specifications" Adaptec Serial ATA RAID 2410SA Enclosure Kit, Printed From Internet May 25, 2007, 3 pgs.
Cook, "Backup and Disaster Recovery", Set Up Raid on Tape, SearchStorage.Com, . Dec. 23, 2003, 6 pgs.

* cited by examiner

*Primary Examiner*—Than Nguyen
(74) *Attorney, Agent, or Firm*—O'Keefe, Egan, Peterman & Enders LLP

(57) ABSTRACT

Systems and methods for managing operation of multiple tape drives in a way so that incoming data is spread or distributed across the multiple tape drives and which may be implemented in one example to continuously accept for recording without interruption from one or more data sources, for example, so that the date is distributed across the multiple tape drives in real time and without interruption as it becomes available from one or more given data sources. Two or more tape drives may be further be managed in a manner such that the multiple drives appear to be a single drive when writing data to, or reading data from, the multiple tape drives.

27 Claims, 5 Drawing Sheets

US 7,809,880 B2

SYSTEMS AND METHODS FOR MANAGING TAPE DRIVE OPERATION

This invention was made with United States Government support under Contract No. F33657-03-G-3013. The Government has certain rights in this invention.

FIELD OF THE INVENTION

The present invention relates generally to tape drive devices, and more particularly to managing operation of multiple tape drive devices.

BACKGROUND OF THE INVENTION

Redundant array of independent disks (RAID) and redundant array of independent tapes (RAIT) are data storage schemes that manage a bank of physical disk or tape drives as an orderly array such that the bank appears to be one logical disk or tape drive. A RAID or RAIT system functions as an array which all drives of the array must logically advance at the same rate as data is written across the array in stripes. The implementation of a RAID or RAIT may be redundant, however, without redundancy the loss of even one drive is catastrophic for all transactions (past and future).

RAID/RAIT systems are both rigid architectures. The size of the array (number of data drives, number of parity drives), size of the data stripes, etc., all are determined when the RAID/RAIT is initialized and remain constant throughout the life of the system. This architecture creates some inefficiency in file size, drive management, and failure recovery flexibility. The inefficiency in file size is caused by the definition of the data stripe. If the data to be written is not an even multiple of the strip size, then the data will be padded out in the array with NULL blocks (a waste of space and time). The inefficiency of drive management is caused by the systems attempt to complete one stripe across all the drives before proceeding onto the next stripe. This is not very noticeable in a RAID because maximum access time to any point on a disk is very small. However, it is very noticeable in a RAIT because a RAIT can not adapt to the unavailability (even momentarily) of a drive, or to greatly changing data rates.

Tape drives in a RAIT suffer from internal maintenance problems (like tape re-tensioning) that don't apply to disk drives of a RAID. As a result, when one tape in the RAIT pauses to perform an internal maintenance task, the entire RAIT pauses. Tapes are also affected by slow data rates more than disks. If the data is not ready when the tape is ready, the tape drive must stop, then when the data is ready, the drive must re-start, and possibly rewind and re-acquire its write location. This continual starting and stopping (thrashing) causes excessive wear on the equipment and wastes a lot of time. For a RAIT to avoid thrashing, it must maintain a minimum data rate greater that the sum of the minimum write speed for all the tape drives in the RAIT. RAID/RAIT systems are also not very flexible since the number of active data drives is fixed and the system can not operate when it is missing even one data drive from the defined minimum number of drives.

The minimum and maximum data rates of a RAIT system suffers from the above-described aspects of the RAIT architecture. Moreover, because of overhead associated with the RAIT system structure, the maximum data rate of a RAIT system never approximates the sum of the maximum data rates of the individual drives, and in practice is often less than half the sum of the maximum data rates of the individual drives. For example, in one conventional configuration, a specialized controller with a RAITO configuration of 4 LTO-3 tape drives (each capable of recording natively 20-80 megabits per second) can only operate at a system rate or 260 gigabits/hour, as compared to the 1.1 terabit per hour capacity that represents the sum of the native recording capacity of the 4 individual LTO-3 drives.

SUMMARY OF THE INVENTION

Disclosed herein are systems and methods for managing operation of multiple (i.e., two or more) tape drives in a way so that incoming data is spread or distributed across the multiple tape drives, e.g., distributed across the multiple tape drives in real time and without interruption as it becomes available from one or more given data sources. The disclosed systems and methods may be advantageously implemented in one exemplary embodiment to continuously accept data for recording without interruption from one or more data sources that are non-interruptible, e.g., such as data obtained in real time from incoming radio frequency (RF) signal/s. In the practice of the disclosed systems and methods, two or more tape drives may be further be managed in a manner such that the multiple drives appear to be a single drive when writing data to, or reading data from, the multiple tape drives.

In one embodiment, the disclosed systems and methods may be implemented to provide a virtual tape device ("VTD") system that includes multiple tape drives that are configured to look like a single drive to a calling application. Internally, the incoming data stream/s may be shredded (i.e., disassembled) and spread for independent and simultaneous writing across multiple drives of the VTD system. In a further embodiment, a VTD system may be implemented to manage operation of a bank of two or more tape drives such that the bank of tape drives appears to be a single drive with minimum system performance (e.g., minimum system recording rate) characteristics that approximate the performance of a single one of the tape drives of the system, and with maximum system performance characteristics (e.g., maximum system recording rate) that approximates the sum of the maximum performance of all drives in the bank. In this regard, the data rate of a VTD system may be configured so that it is capable of accepting data for recording at a rate that is substantially equal to the sum of the maximum recording rates of all of the multiple individual tape drives of the VTD. In other embodiments, the load on the multiple drives may be monitored and managed to account for drive failure and internal maintenance events, and/or the data queues may be managed to ensure that transient data (like data on a DMA circular queue) is recorded before it expires.

In another exemplary embodiment, a VTD system may be provided with a driver (e.g., data shredder, data queue manager, drive scheduler and drive balancer) that shreds or disassembles the incoming data stream and distributes it to the individual drives of the system such that load remains balanced. All the multiple drives required for accepting the incoming data rate may be kept spinning, the data queue length for each of the spinning drives may be managed, and the time to the next latency event (e.g., pause for a drive to perform internal maintenance) for each drive may be staggered so that the VTD system never encounters more than one latency event at one time. In configuring and/or assembling the VTD system, the individual tape drives of the system may optionally be first stress tested to determine maximum latency and latency points of the drives.

In another exemplary embodiment, a flexible (e.g., scalable) tasking algorithm (e.g., implemented by drive balancer and drive scheduler) may be provided for the VTD system that spins only the number of system drives required to maintain the system data rate required at a given time. Additional features that may be implemented by a VTD system include the capability of balancing the load on the tasked drives of the system so as to maintain the minimum spindle speed for each active drive, and the ability to predict, manage and minimize the latency events that occur in the operation of each system drive. A VTD system may also be configured to minimize and manage the failure or removal of any of the system drive/s, and/or to manage the real-time restoration of a drive to the system drive bank. Advantageously, a VTD system of the disclosed systems and methods may be configured to maintains a consistent data rate across a defined time interval so as to provide a guaranteed delivery time.

In one embodiment, a VTD system may be implemented to manage multiple tape drives in a non-array manner that does not utilize data striping. Redundancy is not necessary, although it may be provided (through duplication, a parity scheme, etc).

In one respect, disclosed herein is a method of managing operation of multiple tape drives, including: providing multiple tape drives; providing a continuous data stream at a total tasked data rate; disassembling the continuous data stream into multiple data portions in real time as the data stream is provided; and continuously writing data of the data stream without interruption to the multiple tape drives at the total tasked data rate by simultaneously writing a first group of the multiple data portions to a first one of the multiple tape drives and a second group of the multiple data portions to at least one other of the multiple tape drives.

In another respect, disclosed herein is a virtual tape device (VTD) system, including: a data shredder configured to receive a continuous data stream at a total tasked data rate and to produce shredded data therefrom; a data queue manager configured to receive the shredded data from the data shredder and to provide the shredded data as queued data; a drive scheduler configured to receive queued data from the data queue manager and to schedule and provide the queued data to individual tape drives of a tape drive bank that includes multiple tape drives; and a drive balancer configured to determine and provide a number of needed active drives of the tape drive bank to drive scheduler.

In another respect, disclosed herein is a system for managing operation of multiple tape drives, the system including one or more system components configured to: receive a continuous data stream at a total tasked rate; disassemble the continuous data stream into multiple data portions in real time as the data stream is received; and continuously write data of the data stream without interruption to the multiple tape drives at the total tasked data rate by simultaneously writing a first group of the multiple data portions to a first one of the multiple tape drives and a second group of the multiple data portions to at least one other of the multiple tape drives.

DESCRIPTION OF ILLUSTRATIVE EMBODIMENTS

Figure 1:
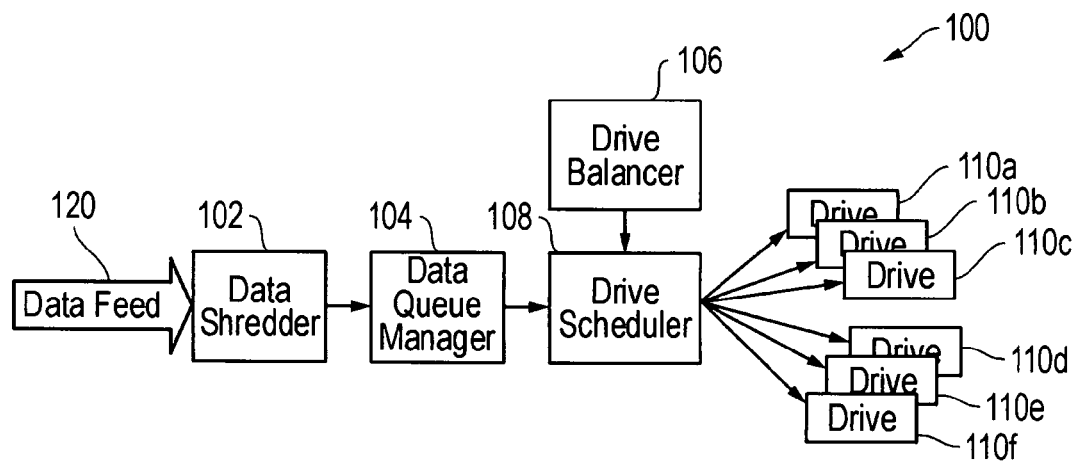
FIG. 1 is a block diagram illustrating logical components of a VTD system according to one exemplary embodiment of the disclosed systems and methods.

FIG. 1 illustrates logical components of a VTD system 100 according to one exemplary embodiment of the disclosed systems and methods. As shown, VTD system includes data shredder 102 which is coupled to receive data feed 120. Data shredder 102 is also coupled to provided shredded data to data queue manager 104, which is in turn coupled to provide queued data to drive scheduler 108. Also shown is drive balancer 106 that is coupled to determine and provide the number of needed active drives to drive scheduler 108. Drive scheduler 108 is in turn coupled to schedule and provide data to individual tape drives 110*a*-110*f*, which together make up a tape drive bank for VTD system 100. In one embodiment, each of tape drives 110*a*-110*f* may be a LTO tape drive, although other types of tape drives may be employed. In one embodiment, each of tape drives 110*a*-110*f* may have substantially the same write buffer size and spindle speed characteristics as each of the other of tape drives 110*a*-110*f*. Although illustrated in FIG. 1 as separate components 102-110, it will be understood that one or more features of a VTD system of the disclosed systems and methods may be implemented using a greater or lesser number of logical components and using any configuration and/or combination of software, firmware, processor/s or other hardware that is suitable for managing operation of multiple tape drives in a manner as described elsewhere herein.

Still referring to the embodiment of FIG. 1, data shredder 102 is configured to receive data feed 120, which may be data from any one or more data sources. Data shredder 102 shreds or disassembles this data into data shreds by segmenting the data stream of data feed 120. In one exemplary embodiment, data shredder 102 may segment the incoming data into data shreds having a size that is optimized to match one or more characteristics of tape drives 110, e.g., by segmenting the incoming data feed 120 into data shreds having a size less than or equal to the write buffer size of tape drives 110. For example, if tape drives 110*a*-110*f* each have the same write buffer size of 2 megabytes, then data shredder 102 may segment the incoming data into data shreds that each have a 2 megabyte size or less in order to match the write buffer size so that each data shred may be written in-whole to tape from the write buffer.

In the event that one or more of multiple tape drives 110 have a write buffer size that differs from the write buffer size of one or more other of multiple tape drives 110, then data shredder 102 may segment the incoming data feed 120 into data shreds having a size less than or equal to the smallest-sized write buffer of the multiple tape drives 110 writing to all of the tape drives 110. Data shredder 102 may also be configured to name data shreds (i.e., portions of disassembled data) to facilitate later reassembly of the shredded data back into its original form when it is retrieved from multiple tape drives 110.

As shown in FIG. 1, drive balancer 106 is coupled to determine and provide information concerning active tape drive availability to drive scheduler 108. In this regard, drive balancer 106 maintains a list of available active drives 110 and determines the number of active drives 110 required to maintain the current data rate of system 100. Drive balancer 106 may determine the number of required active drives 100 based upon, for example, performance characteristics of tape drives 110 in combination with the required real time data rate for system 100 and real time availability of tape drives 110. In one exemplary embodiment, drive balancer 106 may determine the number of required active drives 110 based upon the total tasked data rate for system 100 (e.g., as provided by monitoring the current tasking rate), the optimum spin rate for the drives 110 (e.g., based upon minimum and maximum rated spindle speeds for individual drives), the number of drives 110 currently available (e.g., provided by maintaining a status of all drives in the system), and anticipated and/or sensed drive maintenance events for individual tape drives 110 (e.g., provided by maintaining a status of all drives in the system).

Still referring to FIG. 1, data queue manager 104 receives shredded data from data shredder 102 and adds new write tasks (i.e., data shreds) to the data queue that is maintained by drive scheduler 108, which in turn writes data to tape drives 110. In the embodiment of FIG. 1, drive scheduler 108 is a multi-tasking operation that allows system 100 to maintain its data integrity, and to provide a guaranteed delivery time despite temporary lack of drive availability, sudden catastrophic drive failure or other interruptions or system failures. These characteristics may be achieved because drive scheduler 108 continuously writes data shreds to tape drives 110 in a non-sequential and impendent manner (i.e., each individual data shred is written to a given tape drive 110 independent of, and simultaneously with, the writing of other data shreds to one or more other tape drives 110).

Still referring to FIG. 1, drive scheduler 108 is configured to maintain an input data queue for all active drives 110 (so that none of the active drives 110 drops below its minimum spindle speed data rate) at the total tasked data rate for system 100. This is made possible based on the required active drive determination made by drive balancer 106 (e.g., as described in the foregoing example), and which may be iteratively repeated as described further herein with regard to FIG. 3. Drive scheduler 108 also may operate to anticipate periodic or scheduled maintenance events for each of drives 110, and to stagger the data rate delivered to each drive 110 such that no two drives 110 will enter a periodic or scheduled maintenance mode at the same time. Scheduled maintenance intervals may be determined by heuristic methods and used to predict future maintenance intervals. By slightly increasing/decreasing the load on an individual drive, the drive scheduler 108 may decrease/increase the time to that individual drives maintenance interval. This, combined with the heuristic data (i.e., that is the time and length of a maintenance intervals) allows the drive scheduler 108 to stagger the maintenance intervals of the individual drives. Additionally, drive scheduler 108 is configured to monitor all incomplete write tasks to minimize data write lag times. In this regard, when a write task exceeds its minimum write time, the write attempt counter is incremented and the write task is rescheduled to another drive.

Figure 2:
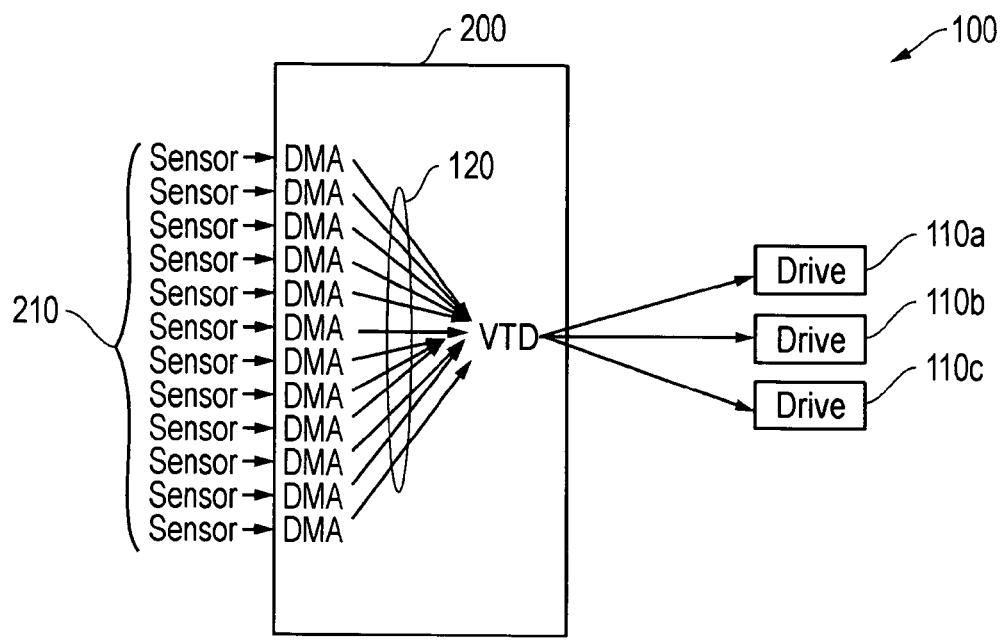
FIG. 2 is a block diagram illustrating a VTD system according to one exemplary embodiment of the disclosed systems and methods.

FIG. 2 illustrates a block diagram of a VTD system 100 according to one exemplary embodiment that includes a VTD processor 200 coupled to receive collected radio frequency (RF) signal data in real time from multiple sensors (e.g., separate receivers) 210 via one or more RF digitizers. In this embodiment, VTD processor 200 may be configured to perform the tasks of the logical components of FIG. 1, and may be implemented using, for example, a processor with digitizers and LTO tape drives attached. In this embodiment, RF signal data from each RF sensor 210 is provided via a respective direct memory access (DMA) channel 120 to multiple tape drives 110*a*-110*c*. In this regard, VTD processor 200 disassembles and writes data shreds to tape drives 110*a*-110*c* using the logical flow of FIG. 1. It will be understood that FIG. 2 is exemplary only and that other types of data (e.g., data streams) may be received and written to multiple tape drives in the practice of the disclosed systems and method. Examples of such other types of data include, but are not limited to, data from electromagnetic signals (e.g., such as RF, radar, microwave, etc.), data from acoustic signals such as sonar or seismic signals, data from computer processing components (e.g., such as supercomputers, a data producing algorithm, capturing network traffic, or data backup), etc.

Figure 3:
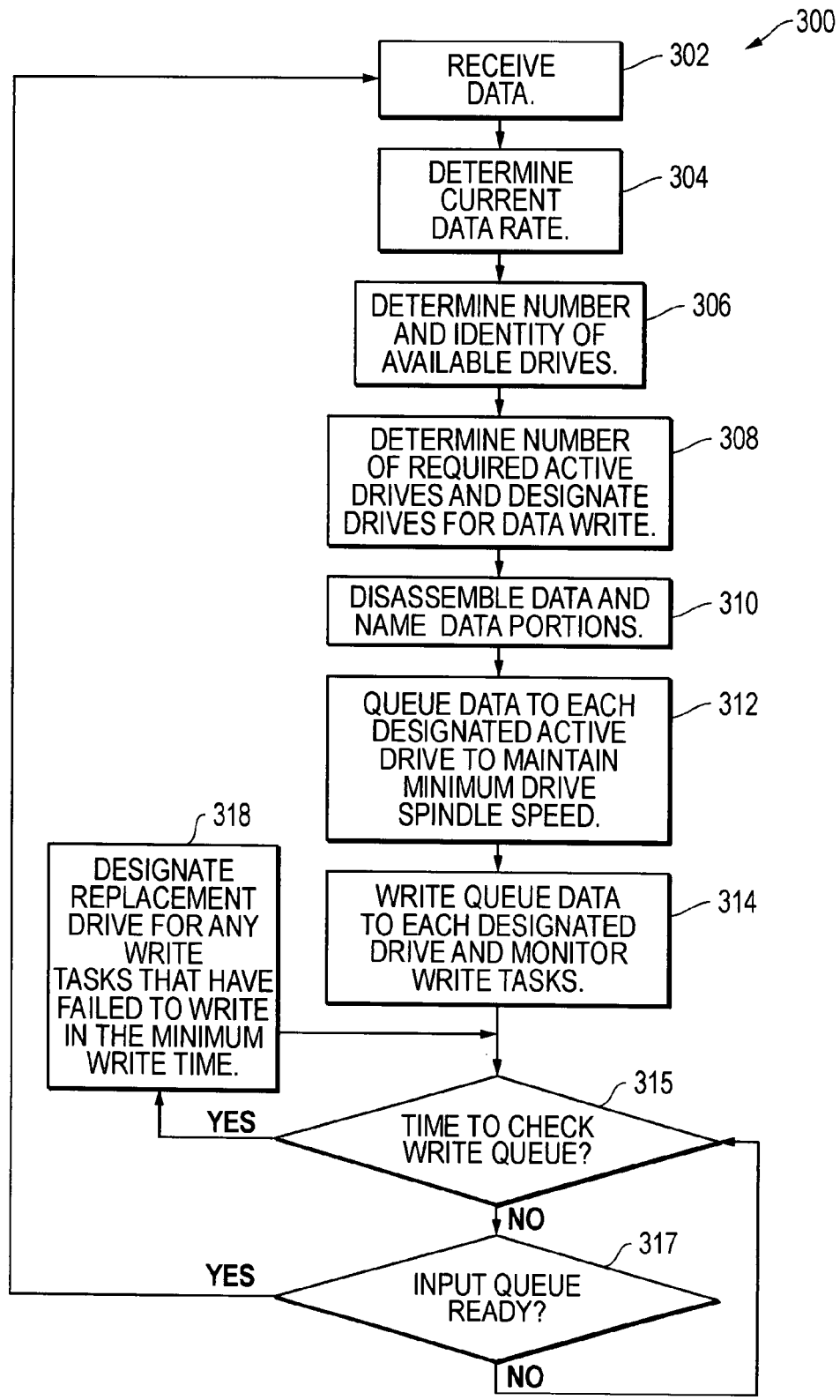
FIG. 3 illustrates methodology that may be employed to manage operation of multiple tape drives according to one exemplary embodiment of the disclosed systems and methods.

FIG. 3 illustrates methodology 300 that may be employed in one exemplary embodiment to manage operation of multiple tape drives (e.g., such as multiple tape drives of VTD system 100 of FIGS. 1 and 2) so that incoming data is distributed across all or a selected portion of the multiple tape drives for writing in real time and substantially without interruption as it becomes available from one or more given data sources. Methodology 300 starts in step 302 where data is received in real time for recording from one or more data source/s. Total current data rate is determined in step 304 for the data received in step 302, and the number and identity of available active tape drives is determined in step 306. In this regard, active tape drives may be selected to include those tape drives that are currently operational and that are not scheduled for periodic maintenance during the anticipated write time for the data received in step 302.

In step 308, the number of tape drives required to write the received data in real time and without interruption is determined, e.g., based on the current data rate divided by a data rate corresponding to a determined optimum spindle speed of each drive (assuming that all available tape drives have the same maximum and minimum spindle speeds). In this regard, the optimal spindle speed of each drive may be selected to be a spindle speed that is greater than the minimum spindle speed of the drive and that this less than the maximum spindle speed of the drive. However, it will be understood that the number of required drives may be selected by dividing the total current data rate by a data rate corresponding to any drive spindle speed that is greater than or equal to the minimum spindle speed of the drive, and that this less than or equal to the maximum spindle speed of each drive As an example, assuming that each tape drive 110 of FIG. 1 has a minimum rated spindle speed of 20 MB/s and a maximum rated spindle speed of 80 MB/s, an optimum spin rate for each drive 110 may be determined in step 308 based on these minimum and maximum rated spindle speeds to be 40 MB/s (e.g., determined by the following calculation: $(2\times TAPE_{MinRate}) + (TAPE_{MinRate}/2) \leq OptimumRate \leq RAIT_{MaxRate}$. Assuming that the number of currently available drives 110 is 3 and that the total tasked data rate for system 100 is 80 MB/s, the preferred number of active drives 110 would be 2.

It will be understood that the spindle speed and data rate characteristics of the foregoing example are exemplary only, as are the particular calculation methodologies employed in the foregoing example. In this regard, drives 110 may have maximum and/or minimum rated spindle speeds different than the values given in the above example, and the total tasked data rate for system 100 may be greater or lesser than the exemplary value given above, and may vary over time (e.g., with varying operating conditions of system 100). Further, any other calculation methodologies may be employed that are suitable for determining optimum tape drive spin rate and/or the number of active tape drives 110 in a manner consistent with the management of multiple tape drive device operation as disclosed herein.

Still referring to step 308 of FIG. 3, the identity of active tape drives designated to record the currently received data may be selected from the available active drives using any suitable methodology, e.g., selecting drives to balance the load, or conversely to favor a drive, etc. Other factors that may be considered in step 308 when designating active drives for data writes include, but are not limited to, anticipated upcoming maintenance events for each of the available drives. In this regard, a group of active tape drives may be designated for upcoming write tasks that is capable of writing the current total data rate without interruption despite upcoming latency events such as scheduled maintenance events (i.e., so that at any given time the minimum number of tape drives needed to handle and write the incoming current total data rate within the desired range of spindle speed is always available for write tasks despite one or more of the designated tape drives being temporarily unavailable for write tasks due to upcoming latency events). Additionally or alternatively, the time to the next latency event for each of the designated active tape drives may be staggered so that not more than a selected given number (e.g., one) of individual drives of a designated group of active tape drives encounters a latency event at any given time, i.e., with the remaining number of individual drives not subject to a latency event being selected so as to be sufficient to handle the current total data rate at a desired range of spindle speed for each of the remaining drives. Furthermore, it will be understood that a first group of selected drives (e.g. tape drives 110a-110c of FIG. 1) may be first designated for upcoming write tasks, and then a second group of selected drives (e.g. tape drives 110d-110f of FIG. 1) may then be designated later for upcoming write tasks (e.g., while the first group of tape drives 110a-110c are read from, replaced, or otherwise idled or used for a different purpose).

In step 310 the currently received data of step 302 is disassembled into data portions (i.e., data shreds) that are each named for purposes of later re-assembly, and the data portions are then queued to each designated drive in step 312. In this regard, the data load may be balanced between the drives designated in step 308 so that an input data queue is maintained for each of the designated drives that contains a sufficient data rate (of data shreds) to ensure that each designated drive stays at or above its minimum spindle speed data rate and at or below its maximum spindle speed data rate. In step 314, the queued data of step 312 is then written to each designated drive of step 308 and the completion of all write tasks monitored. In this regard, a given data shred may be written to the next available of the designated drives, and may be written to this drive simultaneous with the writing of other data shreds to other designated drive. The write queue is monitored in steps 315 and 317. In this regard, status of the write queue may be periodically checked (e.g., every 0.25 seconds or other suitable selected period of time). If a write task is found to have exceeded its minimum write time, then it is rescheduled in step 318 to another designated drive and step 315 repeated as shown (this process is repeated until the write task is completed). In this way, data write delivery time and data integrity may be maintained in real time despite temporary or permanent failure of a designated active tape drive (even when such a failure is sudden) or other failure/problem leading to interruption of data flow to one or more active tape drives. Step 317 determines when more data is available in the input queue(s), and when this data is available, the process repeats itself by starting again at step 302. Until data is ready in the input queue, step 317 repeats to step 315 as shown.

It will be understood that the order and methodology of the steps of FIG. 3 is exemplary only and that any other combination of additional, fewer and/or alternative steps may be employed that is suitable for managing operation of multiple tape drives so that incoming data is distributed across all or a selected portion of the multiple tape drives for writing in real time and substantially without interruption as it becomes available from one or more given data sources.

Once disassembled (i.e., shredded) data has been written to a designated group of multiple tape drives using the disclosed systems and methods (e.g., such as described and illustrated with regard to FIGS. 1-3), the stored data portions may be processed at a later time or in real time, and/or in-whole or in-part as may be desired. For example, data portions written in step 314 of FIG. 3 may be retrieved from the designated tape drives and reassembled using the data portion names assigned in step 310.

In one exemplary embodiment, the disclosed systems and methods may be implemented (e.g., using methodology 300 of FIG. 3 and components of VTD system 100 of FIG. 1) to achieve a VTD system that operates consistent with the following operating data rate relationship between operating minimum recording data rate for the VTD system (VTDMinRate) and operating maximum recording data rate for the VTD system (VTDMaxRate):

$$VTD_{MinRate} = TAPE_{MinRate}$$

$$VTD_{MaxRate} \cong 0.9(TAPE_{MaxRate} \times N)$$

where: $TAPE_{MinRate}$ represents minimum recording data rate for a single tape drive of the VTD system, i.e., a recording rate lower than this will cause the tape drive to thrash (continually stop/start) as the rate is lower than it's spindle speed. The value of this constant may be determined from the equipment specifications, and/or by test and measurement of the tape drive performance.

$TAPE_{MaxRate}$ represents maximum recording data rate for a single tape drive. The value of this constant may be determined from the equipment specifications, and/or by test and measurement of the tape drive performance.

The guaranteed delivery time ($T_{Guarantee}$) for the VTD system that may be expressed as follows with all the following relationships being true:

$$T_{Guarantee} \leq T_{MaxLatency} + T_{MaxRecovery}$$

$$T_{Guarantee} < |T_{LatencyEvent1} - T_{LatencyEvent2}|/N$$

$$T_{Guarantee} < Q_{size}/VTD_{MaxRate}$$

$$T_{MaxRecovery} \geq (T_{MaxLatency} + TAPE_{MaxRate})/VTD_{MaxRate}$$

where: $T_{Guarantee}$ represents guaranteed time of delivery. All requests are guaranteed to be completed within this timeframe.

$T_{LatencyEvent1}$ & $T_{LatencyEvent2}$ represent time of two respective latency events.

$T_{MaxLatency}$ represents time of maximum latency for a tape drive. This maximum latency is associated with the internal maintenance and house keeping for the drive. The value of this constant may be determined by test and measurement of the tape drive performance.

$T_{MaxRecovery}$ represents maximum time required to recover from the maximum latency event having a latency time of $T_{MaxLatency}$. The value of this constant may be calculated as expressed earlier in the paragraph.

$Q_{size}$ represents the amount of memory that can be dedicated to the driver. This constant may be defined, for example, by an engineer and based on consideration given to the amount of memory available in the system and the maximum data rate ($VTD_{MaxRate}$) desired for the system to support).

N represents the number of tape drives in the bank.

In contrast, the relationship between the operating minimum data recording rate for a conventional RAIT system and operating maximum recording data rate for a conventional RAIT system may be expressed as follows:

$$RAIT_{MinRate} = TAPE_{MinRate} \times N \text{ (Note: Any slower would cause thrashing)}$$

$$RAIT_{MaxRate} < TAPE_{MaxRate} \times n \text{ (Note: Generally employs substantially less rate)}$$

where:

$RAIT_{MinRate}$=Minimum recording rate for a RAIT system.

$RAIT_{MaxRate}$=Maximum recording rate for a RAIT system.

N=Number of tape drives in the bank.

n=Number of tape data drives in the bank.

NOTE: "N" versus "n". To support redundancy, there are often drives designated as data drives, or as parity drives. The total number of tape drives in the active bank affects the minimum recording speed, and the maximum recording speed is limited by the actual number of designated data drives.

As may be seen by comparing the above equations, a conventional RAIT system must maintain a much greater minimum VTD system recording data rate (equal to $TAPE_{MinRate} \times N$) than the lower minimum system recording data rate (equal to $TAPE_{MinRate}$) that is advantageously made possible using one embodiment of the disclosed VTD systems and methods. Moreover the maximum system recording data rate (substantially less than $TAPE_{MaxRate} \times n$) that is possible using a conventional RAIT system does not approximate the sum of the maximum recording rates of the individual drives of the system, and is lower than the maximum system recording data rate (approximately equal to $0.9(TAPE_{MaxRate} \times N)$) that is advantageously made possible using one embodiment of the disclosed VTD systems and methods.

Figure 4:
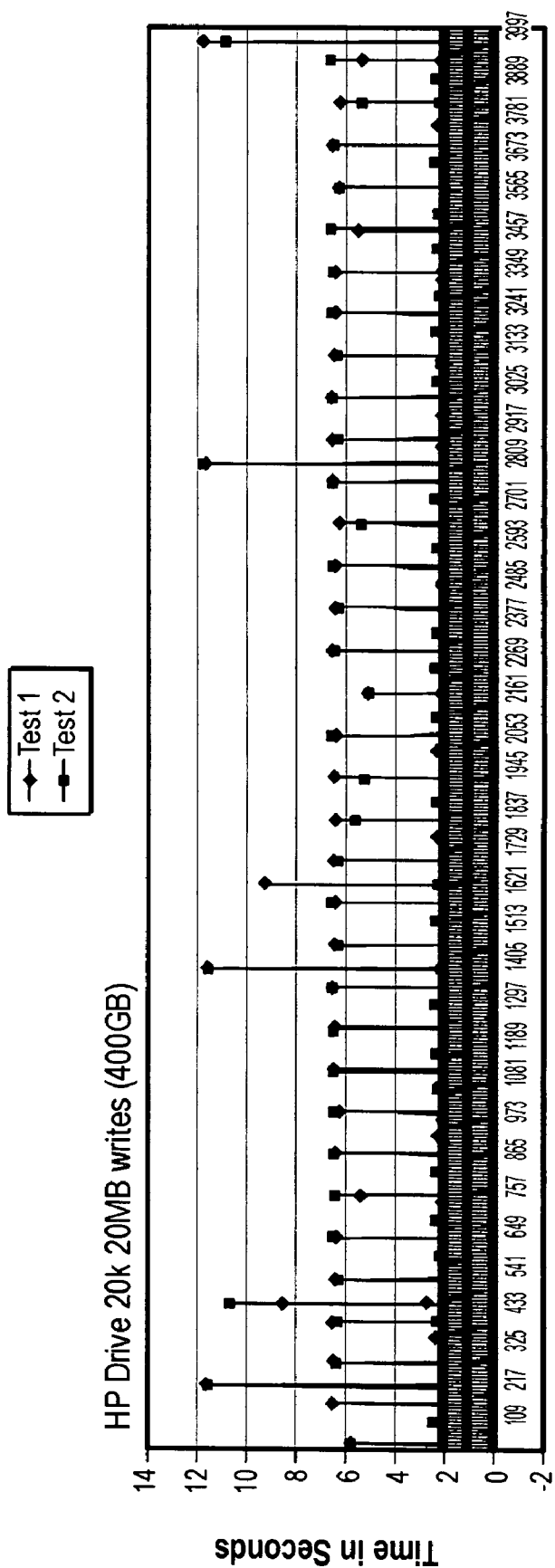
FIG. 4 illustrates number of tape writes versus write completion time for a Hewlett-Packard (HP) LTO-3 drive.
Figure 5:
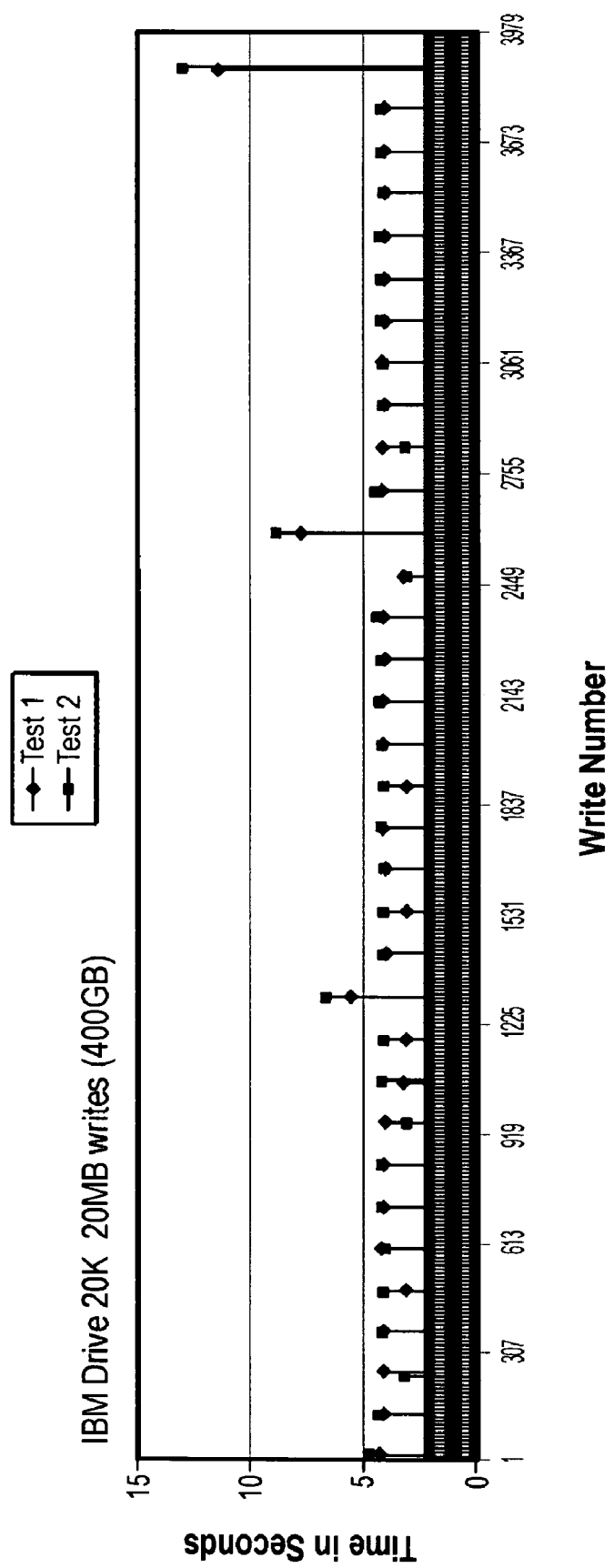
FIG. 5 illustrates number of tape writes versus write completion time for an IBM LTO-3 drive.

FIGS. 4-5 illustrate test and measurement of tape drive write performance for two different tape drives, and illustrates how latency values for a given drive may be measured. In each of FIGS. 4-5, individual writes are represented in sequential manner by data points on the X-axis (i.e., so that the value of the X-axis represents the number of writes in the test), and the Y-axis represents the time (in seconds) to complete each write. As may be seen from FIGS. 4-5, the vast majority of the writes for each drive are completed in less than 2 seconds, with latency events indicated by those spikes of greater write completion time that fall outside this normal write time. In particular, FIG. 4 illustrates results of two latency tests (labeled "Test 1" and "Test 2", respectively) for a Hewlett-Packard (HP) LTO-3 drive using 20 MB writes in which maximum measured latency time is about 12 seconds. FIG. 5 illustrates results of two latency tests (labeled "Test 1" and "Test 2", respectively) for an IBM LTO-3 drive using 20 MB writes in which maximum measured latency time is about 13 seconds. When such drives are employed for use in a conventional RAIT system write data in sequence to multiple drives, such latency time events limit the system speed since the system must wait for each latency event to complete before preceding with the write process.

Figure 6:
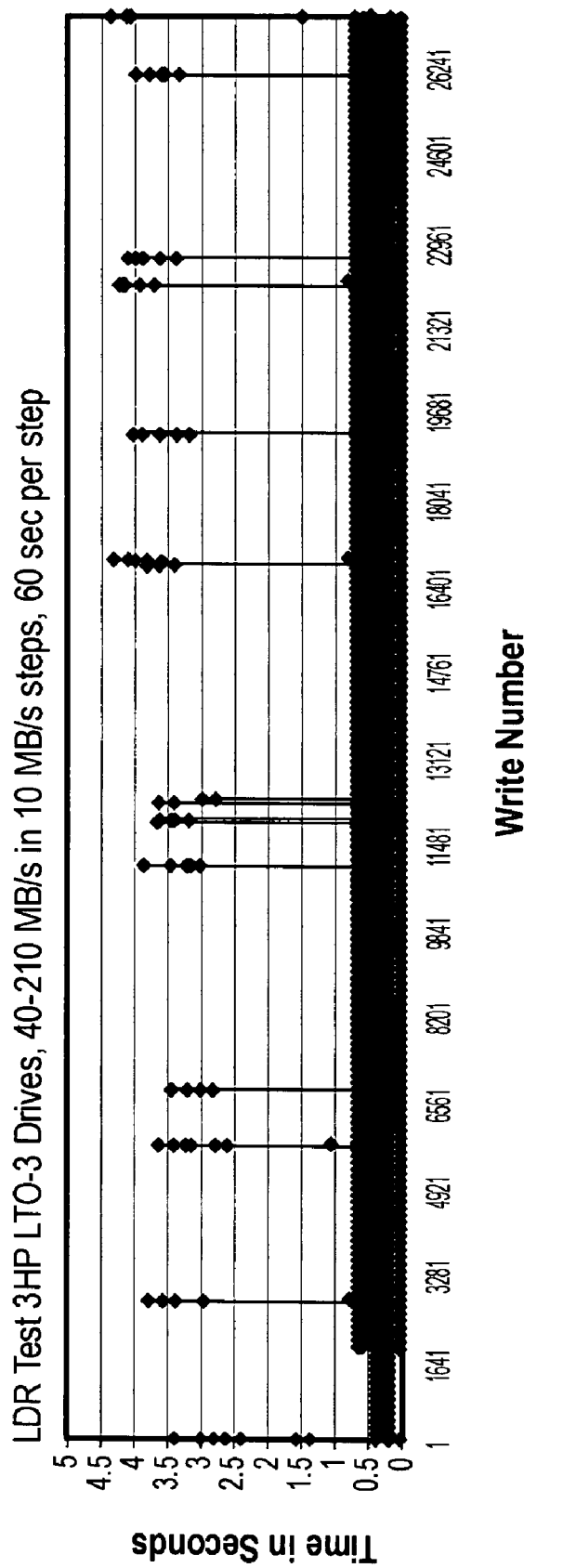
FIG. 6 illustrates number of tape writes versus write completion time for a VTD system configured according to one exemplary embodiment of the disclosed systems and methods.

FIG. 6 illustrates results of a latency test for a VTD system (LDR) configured according to one exemplary embodiment of the disclosed systems and methods, and having three HP LTO-3 tape drives that are the same type of drive as used for the latency tests of FIG. 4. As with FIGS. 4-5, individual writes are represented in sequential manner by data points on the X-axis (i.e., so that the value of the X-axis represents the number of writes in the test), and the Y-axis represents the time (in seconds) to complete each write. During the test of this embodiment, the VTD system continuously receives data at a total tasked data rate varying from 40 to 210 megabytes per second (with the rate increasing by 10 MB/s every 60 seconds). As may be seen from the data of FIG. 6, the average time for each write is less than 1 second, with the longest write time being less than 5 seconds. Thus, the VTD system of this embodiment achieves a recording data rate sufficient to match the incoming data rate of 40 to 210 megabytes per second, with maximum latency time for any given write of less than 5 seconds, which is less than the 12 second maximum latency time of a given individual HP tape drive of the system.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of managing operation of multiple tape drives, comprising:

providing multiple tape drives;

providing a continuous data stream at a total tasked data rate;

disassembling said continuous data stream into multiple data portions in real time as said data stream is provided; and continuously writing data of said data stream without interruption to said multiple tape drives at said total tasked data rate by simultaneously writing a first group of said multiple data portions to a first one of said multiple tape drives and a second group of said multiple data portions to at least one other of said multiple tape drives such that each data portion is independently written to a given tape drive at the same time that another data portion is written to another tape drive and such that the data portions are written to the multiple tape drives in a non-sequential manner without data striping.

2. The method of claim 1, further comprising naming each of said data portions prior to writing each of said data portions to one of said multiple tape drives, said data portions being named in a manner to allow later retrieval and re-assembly of said data portions from said multiple tape drives to recreate said data stream.

3. The method of claim 2, further comprising retrieving said written data portions from each of said multiple tape drives; and re-assembling said data portions from said multiple tape drives to recreate said data stream.

4. The method of claim 1, wherein each of said multiple tape drives has a minimum spindle speed data rate and a maximum spindle speed data rate; wherein the total tasked data rate varies in real time as data is continuously provided; wherein the method further comprises queuing a number of said data portions of said data stream for writing to each of said multiple tape drives as the tasked data rate varies in real time to maintain an input data queue for each of said multiple tape drives that provides a data writing rate for each of said multiple tape drives as the tasked data rate varies in real time as data is continuously provided that is greater than or equal to the minimum spindle speed data rate for each of said multiple tape drives and that is less than or equal to the maximum spindle speed data rate for each of said multiple drives; and wherein the minimum spindle speed data rate of a given tape drive corresponds to a data recording rate below which the given tape drive will continuously stop and start.

5. The method of claim 1, wherein each of said multiple tape drives has a minimum spindle speed data rate and a maximum spindle speed data rate; wherein the total tasked data rate varies in real time as data is continuously provided; and wherein the method further comprises:

determining a current real time total tasked data rate required to continuously write said data of said data stream to said multiple tape drives as the total tasked data rate varies in real time;

determining the current identity of available active tape drives of said multiple tape drives as the total tasked data rate varies in real time;

determining a current number of said available active tape drives required to allow continuous writing of said data of said data stream at said current real time total tasked data rate simultaneously to said multiple tape drives without interruption as said total tasked data rate varies in real time, and at a data rate to each drive that is greater than or equal to the minimum spindle speed data rate for each of said multiple tape drives and that is less than or equal to the maximum spindle speed data rate for each of said multiple drives, wherein the minimum spindle speed data rate of a given tape drive corresponds to a data recording rate below which the given tape drive will continuously stop and start;

designating a current group of tape drives from said determined available active tape drives, said current designated group of tape drives including a number of available active tape drives corresponding to said determined number of current available active tape drives required to allow continuous writing of said data of said data stream at said current real time total tasked data rate and simultaneously to said multiple tape drives without interruption as said total tasked data rate varies in real time; and continuously writing data of said data stream without interruption to a designated group of available active tape drives as said total tasked data rate varies in real time as data is continuously provided by simultaneously writing a first group of said multiple data portions to a first one of currently designated multiple tape drives and a second group of said multiple data portions to at least one other of currently designated multiple tape drives such that each data portion is independently written to a given tape drive at the same time that another data portion is written to another tape drive and such that the data portions are written to the multiple tape drives in a non-sequential manner without data striping.

6. The method of claim 5, further comprising monitoring completion of all write tasks to each of said designated group of available active tape drives; designating a new active available tape drive from said determined available active tape drives to replace a previously designated available active tape drive when a failed write task occurs to said previously designated available active tape drive; and writing data corresponding to said failed write task to said new designated active available tape drive.

7. The method of claim 5, further comprising determining upcoming periodic or scheduled maintenance events for each of said available active tape drives of said multiple tape drives; and designating said group of tape drives selected from said determined available active tape drives such that no two drives of said designated group of available active tape drives will enter a scheduled or periodic maintenance mode at the same time.

8. The method of claim 1, wherein said data stream comprises radio frequency (RF) signal data received in real time.

9. A virtual tape device (VTD) system, comprising:

a data shredder configured to receive a continuous data stream at a total tasked data rate and to produce shredded data therefrom;

a data queue manager configured to receive said shredded data from said data shredder and to provide said shredded data as queued data;

a drive scheduler configured to receive queued data from said data queue manager and to schedule and provide said queued data to individual tape drives of a tape drive bank that comprises multiple tape drives; and a drive balancer configured to determine and provide a number of needed active drives of said tape drive bank to drive scheduler;

wherein said drive scheduler is further configured to continuously write data of said data stream without interruption to said multiple tape drives at said total tasked data rate by simultaneously writing a first group of said multiple data portions to a first one of said multiple tape drives and a second group of said multiple data portions to at least one other of said multiple tape drives such that each data portion is independently written to a given tape drive at the same time that another data portion is written to another tape drive and such that the data portions are written to the multiple tape drives in a non-sequential manner without data striping.

10. The system of claim 9, wherein said data shredder is further to name individual data shreds of said shredded data in a manner to allow later retrieval and re-assembly of said shredded data to recreate said data stream.

11. The system of claim 9, wherein each of said multiple tape drives has a minimum spindle speed data rate and a maximum spindle speed data rate; wherein the total tasked data rate varies in real time as data is continuously provided; wherein said drive scheduler is further configured to maintain an input data queue for each of said multiple tape drives based on said number of needed active drives provided by said drive balancer such that said input data queue for each of said multiple tape drives provides a data writing rate for each of said multiple tape drives as the tasked data rate varies in real time as data is continuously provided that is greater than or equal to the minimum spindle speed data rate for each of said multiple tape drives and that is less than or equal to the maximum spindle speed data rate for each of said multiple drives; and wherein the minimum spindle speed data rate of a given tape drive corresponds to a data recording rate below which the given tape drive will continuously stop and start.

12. The system of claim 9, wherein each of said multiple tape drives has a minimum spindle speed data rate and a maximum spindle speed data rate; wherein the total tasked data rate varies in real time as data is continuously provided; and wherein said drive balancer is further configured to:

determine a current real time total tasked data rate required to continuously write said data of said data stream to said multiple tape drives as the total tasked data rate varies in real time;

determine the current identity of available active tape drives of said multiple tape drives as the total tasked data rate varies in real time;

determine a current number of said available active tape drives required to allow continuous writing of said data of said data stream at said current real time total tasked data rate and simultaneously to said multiple tape drives without interruption as said total tasked data rate varies in real time, and at a data rate to each drive that is greater than or equal to the minimum spindle speed data rate for each of said multiple tape drives and that is less than or equal to the maximum spindle speed data rate for each of said multiple drives, wherein the minimum spindle speed data rate of a given tape drive corresponds to a data recording rate below which the given tape drive will continuously stop and start; and designate a current group of tape drives selected from said determined available active tape drives, said current designated group of tape drives including a number of current available active tape drives corresponding to said determined number of available active tape drives required to allow continuous writing of said data of said data stream at said current real time total tasked data rate and simultaneously to said multiple tape drives without interruption as said total tasked data rate varies in real time;

wherein said data scheduler is configured to continuously write data of said data stream without interruption to a designated group of available active tape drives as said total tasked data rate varies in real time as data is continuously provided by simultaneously writing a first queue of said shredded data to a first one of currently designated multiple tape drives and a second queue of said shredded data to at least one other of currently designated multiple tape drives such that each data portion is independently written to a given tape drive at the same time that another data portion is written to another tape drive and such that the data portions are written to the multiple tape drives in a non-sequential manner without data striping.

13. The system of claim 12, wherein said drive scheduler is further configured to: monitor completion of all write tasks to each of said designated group of available active tape drives; designate a new active available tape drive from said determined available active tape drives to replace a previously designated available active tape drive when a failed write task occurs to said previously designated available active tape drive; and write data corresponding to said failed write task to said new designated active available tape drive.

14. The system of claim 12, wherein said drive scheduler is further configured to: determine upcoming periodic or scheduled maintenance events for each of said available active tape drives of said multiple tape drives; and designate said group of tape drives selected from said determined available active tape drives such that no two drives of said designated group of available active tape drives will enter a scheduled or periodic maintenance mode at the same time.

15. The system of claim 9, wherein said VTD system further comprises multiple tape drives of said tape drive bank.

16. A system for managing operation of multiple tape drives, said system comprising:

a data shredder configured to receive a continuous data stream at a total tasked rate and disassemble said continuous data stream into multiple data portions in real time as said data stream is received; and a drive scheduler configured to continuously write data of said data stream without interruption to said multiple tape drives at said total tasked data rate by simultaneously writing a first group of said multiple data portions to a first one of said multiple tape drives and a second group of said multiple data portions to at least one other of said multiple tape drives such that each data portion is independently written to a given tape drive at the same time that another data portion is written to another tape drive and such that the data portions are written to the multiple tape drives in a non-sequential manner without data striping.

17. The system of claim 16, wherein said data shredder is configured to name each of said data portions prior to writing each of said data portions by said drive scheduler to one of said multiple tape drives, said data portions being named in a manner to allow later retrieval and re-assembly of said data portions from said multiple tape drives to recreate said data stream.

18. The system of claim 16, wherein each of said multiple tape drives has a minimum spindle speed data rate and a maximum spindle speed data rate; wherein the total tasked data rate varies in real time as data is continuously provided; and wherein the system further comprises a data queue manager configured to queue a number of said data portions of said data stream for writing by said drive scheduler to each of said multiple tape drives as the tasked data rate varies in real time; and wherein said drive scheduler is configured to maintain an input data queue for each of said multiple tape drives that provides a data writing rate for each of said multiple tape drives as the tasked data rate varies in real time as data is continuously provided that is greater than or equal to the minimum spindle speed data rate for each of said multiple tape drives and that is less than or equal to the maximum spindle speed data rate for each of said multiple drives; and wherein the minimum spindle speed data rate of a given tape drive corresponds to a data recording rate below which the given tape drive will continuously stop and start.

19. The system of claim 16, wherein each of said multiple tape drives has a minimum spindle speed data rate and a maximum spindle speed data rate; wherein the total tasked data rate varies in real time as data is continuously provided; and wherein the system further comprises a drive balancer configured to:

determine a current real time total tasked data rate required to continuously write said data of said data stream to said multiple tape drives as the total tasked data rate varies in real time;

determine the current identity of available active tape drives of said multiple tape drives as the total tasked data rate varies in real time;

determine a current number of said available active tape drives required to allow continuous writing of said data of said data stream at said current real time total tasked data rate and simultaneously to said multiple tape drives without interruption as said total tasked data rate varies in real time, and at a data rate to each drive that is greater than or equal to the minimum spindle speed data rate for each of said multiple tape drives and that is less than or equal to the maximum spindle speed data rate for each of said multiple drives, wherein the minimum spindle speed data rate of a given tape drive corresponds to a data recording rate below which the given tape drive will continuously stop and start;

designate a current group of tape drives selected from said determined available active tape drives, said current designated group of tape drives including a number of available active tape drives corresponding to said determined number of current available active tape drives required to allow continuous writing of said data of said data stream at said current real time total tasked data rate and simultaneously to said multiple tape drives without interruption as said total tasked data rate varies in real time; and wherein said drive scheduler is further configured to continuously write data of said data stream without interruption to said designated group of available active tape drives as said total tasked data rate varies in real time as data is continuously provided by simultaneously writing a first group of said multiple data portions to a first one of currently designated multiple tape drives and a second group of said multiple data portions to at least one other of currently designated multiple tape drives such that each data portion is independently written to a given tape drive at the same time that another data portion is written to another tape drive and such that the data portions are written to the multiple tape drives in a non-sequential manner without data striping.

20. The system of claim 19, wherein said drive scheduler is further configured to: monitor completion of all write tasks to each of said designated group of available active tape drives; designate a new active available tape drive from said determined available active tape drives to replace a previously designated available active tape drive when a failed write task occurs to said previously designated available active tape drive; and write data corresponding to said failed write task to said new designated active available tape drive.

21. The system of claim 19, wherein said drive scheduler is further configured to determine upcoming periodic or scheduled maintenance events for each of said available active tape drives of said multiple tape drives; and designate said group of tape drives selected from said determined available active tape drives such that no two drives of said designated group of available active tape drives will enter a scheduled or periodic maintenance mode at the same time.

22. The system of claim 16, wherein said data stream comprises radio frequency (RF) signal data received in real time.

23. A method of managing operation of multiple tape drives, comprising:
providing multiple tape drives;
providing a continuous data stream at a total tasked data rate;
disassembling said continuous data stream into multiple data portions in real time as said data stream is provided; and
continuously writing data of said data stream without interruption to said multiple tape drives at said total tasked data rate by simultaneously writing a first group of said multiple data portions to a first one of said multiple tape drives and a second group of said multiple data portions to at least one other of said multiple tape drives;
wherein the method further comprises:
determining said total tasked data rate required to continuously write said data of said data stream to said multiple tape drives,
determining the identity of available active tape drives of said multiple tape drives,
determining a number of said available active tape drives required to allow continuous writing of said data of said data stream at said total tasked data rate in real time and simultaneously to said multiple tape drives without interruption and at a data rate to each drive that is greater than or equal to the minimum spindle speed data rate for each of said multiple tape drives and that is less than or equal to the maximum spindle speed data rate for each of said multiple drives,
designating a group of tape drives from said determined available active tape drives, said designated group of tape drives including a number of available active tape drives corresponding to said determined number of available active tape drives required to allow continuous writing of said data of said data stream at said total tasked data rate in real time and simultaneously to said multiple tape drives without interruption, and
continuously writing data of said data stream without interruption to said designated group of available active tape drives at said total tasked data rate by simultaneously writing a first group of said multiple data portions to a first one of said designated multiple tape drives and a second group of said multiple data portions to at least one other of said designated multiple tape drives; and
wherein said method further comprises determining upcoming periodic or scheduled maintenance events for each of said available active tape drives of said multiple tape drives, and designating said group of tape drives selected from said determined available active tape drives such that no two drives of said designated group of available active tape drives will enter a scheduled or periodic maintenance mode at the same time.

24. A virtual tape device (VTD) system, comprising:
a data shredder configured to receive a continuous data stream at a total tasked data rate and to produce shredded data therefrom;
a data queue manager configured to receive said shredded data from said data shredder and to provide said shredded data as queued data;
a drive scheduler configured to receive queued data from said data queue manager and to schedule and provide said queued data to individual tape drives of a tape drive bank that comprises multiple tape drives; and
a drive balancer configured to determine and provide a number of needed active drives of said tape drive bank to drive scheduler;
wherein said drive balancer is further configured to:
determine said total tasked data rate required to continuously write said data of said data stream to said multiple tape drives,
determine the identity of available active tape drives of said multiple tape drives,
determine a number of said available active tape drives required to allow continuous writing of said data of said data stream at said total tasked data rate in real time and simultaneously to said multiple tape drives without interruption and at a data rate to each drive that is greater than or equal to the minimum spindle speed data rate for each of said multiple tape drives and that is less than or equal to the maximum spindle speed data rate for each of said multiple drives, and
designate a group of tape drives selected from said determined available active tape drives, said designated group of tape drives including a number of available active tape drives corresponding to said determined number of available active tape drives required to allow continuous writing of said data of said data stream at said total tasked data rate in real time and simultaneously to said multiple tape drives without interruption, and
wherein said data scheduler is configured to continuously write data of said data stream without interruption to said designated group of available active tape drives at said total tasked data rate by simultaneously writing a first queue of said shredded data to a first one of said designated multiple tape drives and a second queue of said shredded data to at least one other of said designated multiple tape drives; and wherein said drive scheduler is further configured to determine upcoming periodic or scheduled maintenance events for each of said available active tape drives of said multiple tape drives, and designate said group of tape drives selected from said determined available active tape drives such that no two drives of said designated group of available active tape drives will enter a scheduled or periodic maintenance mode at the same time.

25. A system for managing operation of multiple tape drives, said system comprising:

a data shredder configured to receive a continuous data stream at a total tasked rate and disassemble said continuous data stream into multiple data portions in real time as said data stream is received; and a drive scheduler configured to continuously write data of said data stream without interruption to said multiple tape drives at said total tasked data rate by simultaneously writing a first group of said multiple data portions to a first one of said multiple tape drives and a second group of said multiple data portions to at least one other of said multiple tape drives:

wherein the system further comprises a drive balancer configured to:

determine said total tasked data rate required to continuously write said data of said data stream to said multiple tape drives, determine the identity of available active tape drives of said multiple tape drives, determine a number of said available active tape drives required to allow continuous writing of said data of said data stream at said total tasked data rate in real time and simultaneously to said multiple tape drives without interruption and at a data rate to each drive that is greater than or equal to the minimum spindle speed data rate for each of said multiple tape drives and that is less than or equal to the maximum spindle speed data rate for each of said multiple drives, wherein the minimum spindle speed data rate of a given tape drive corresponds to a data recording rate below which the given tape drive will continuously stop and start, designate a group of tape drives selected from said determined available active tape drives, said designated group of tape drives including a number of available active tape drives corresponding to said determined number of available active tape drives required to allow continuous writing of said data of said data stream at said total tasked data rate in real time and simultaneously to said multiple tape drives without interruption, wherein said drive scheduler is further configured to continuously write data of said data stream without interruption to said designated group of available active tape drives at said total tasked data rate by simultaneously writing a first group of said multiple data portions to a first one of said designated multiple tape drives and a second group of said multiple data portions to at least one other of said designated multiple tape drives; and wherein said drive scheduler is further configured to determine upcoming periodic or scheduled maintenance events for each of said available active tape drives of said multiple tape drives, and designate said group of tape drives selected from said determined available active tape drives such that no two drives of said designated group of available active tape drives will enter a scheduled or periodic maintenance mode at the same time.

26. A method of managing operation of multiple tape drives, comprising:

providing multiple tape drives;

providing a continuous data stream at a total tasked data rate;

disassembling said continuous data stream into multiple data portions in real time as said data stream is provided; and continuously writing data of said data stream without interruption to one or more of said multiple tape drives at said total tasked data rate without data striping;

wherein each of said multiple tape drives has a minimum spindle speed data rate and a maximum spindle speed data rate; wherein the total tasked data rate varies in real time as data is continuously provided; and wherein the method further comprises perfuming the following steps in real time as data is continuously provided:

(a) determining and designating a number of one or more of said multiple tape drives required to allow continuous writing of said data of said data stream at a current real time total tasked data rate without interruption, and at a data rate to each drive written to that is greater than or equal to the minimum spindle speed data rate for each written-to drive, wherein the minimum spindle speed data rate of a given tape drive corresponds to a data recording rate below which the given tape drive will continuously stop and start, (b) continuously writing data of said data stream to said determined and designated number of one or more of said multiple tape drives at said total tasked data rate without interruption and without data striping, and (c) repeating steps (a) and (b) to continuously write data of said provided data stream without interruption to one or more of said active tape drives as said data is continuously provided at a varying total tasked data rate.

27. A system for managing operation of multiple tape drives, said system comprising:

a data shredder configured to receive a continuous data stream at a total tasked rate and disassemble said continuous data stream into multiple data portions in real time as said data stream is received; and a drive scheduler configured to continuously write data of said data stream without interruption to one or more of said multiple tape drives at said total tasked data rate without data striping:

wherein each of said multiple tape drives has a minimum spindle speed data rate and a maximum spindle speed data rate; wherein the total tasked data rate varies in real time as data is continuously provided; and wherein the system further comprises a drive balancer;

wherein said system is configured such that:

(a) said drive balancer determines and designates a number of one or more of said multiple tape drives required to allow continuous writing of said data of said data stream at a current real time total tasked data rate without interruption, and at a data rate to each drive written to that is greater than or equal to the minimum spindle speed data rate for each written-to drive, wherein the minimum spindle speed data rate of a given tape drive corresponds to a data recording rate below which the given tape drive will continuously stop and start; and (b) said drive scheduler continuously writes data of said data stream to said determined and designated number of one or more of said multiple tape drives at said total tasked data rate without interruption and without data striping; and (c) said drive balancer and said drive scheduler repeat steps (a) and (b) to continuously write data of said provided data stream without interruption to one or more of said active tape drives as said data is continuously provided at a varying total tasked data rate.

* * * * *